United States Patent [19]
Couch et al.

[11] 4,145,918
[45] Mar. 27, 1979

[54] FREEZE-THAW INDICATOR

[75] Inventors: Thomas W. Couch, Asheville, N.C.;
Erick-Pierre Fournier, New York, N.Y.; James A. Harvey, Enka, N.C.; Derk T. A. Huibers, Madison, N.J.; Howard A. Mercer, Asheville, N.C.

[73] Assignee: Akzona Incorporated, Asheville, N.C.

[21] Appl. No.: 720,853

[22] Filed: Sep. 7, 1976

[51] Int. Cl.² .................................. G01K 11/06
[52] U.S. Cl. .................... 116/216; 73/358; 116/217; 206/459; 426/88; 116/219
[58] Field of Search ........... 116/114 Y, 114 Z, 114.5; 62/66; 239/2 S, 14, 2 R; 206/461, 462, 459; 73/358; 426/88; 252/408

[56] References Cited
U.S. PATENT DOCUMENTS

| | | | |
|---|---|---|---|
| 1,535,536 | 4/1925 | MacDonald | 116/114.5 X |
| 2,753,270 | 7/1956 | DiRenzo | 116/114.5 |
| 2,850,393 | 9/1958 | Romito | 116/114.5 |
| 2,852,394 | 9/1958 | Fahringer | 116/114.5 |
| 2,932,971 | 4/1960 | Moore et al. | 116/114 S X |
| 2,994,404 | 8/1961 | Schifferly | 206/462 X |
| 3,129,817 | 4/1964 | Rohdin | 206/462 |
| 3,249,217 | 5/1966 | Irving | 206/461 |
| 3,272,434 | 9/1966 | Zettlemoyer et al. | 239/14 X |
| 3,980,581 | 9/1976 | Godsey, Jr. et al. | 116/114 V X |

OTHER PUBLICATIONS

Publ. "Water at −72°", Dr. Earl C. McCracken, from Science, May 28, 1948, vol. 107.
Publ. "The Nucleation & Growth of Ice Crystals", B. J. Mason, Am. Geophysical Union (1960) pp. 226-231.

Primary Examiner—Daniel M. Yasich
Attorney, Agent, or Firm—Francis W. Young; David M. Carter

[57] ABSTRACT

A freeze and thaw indicator is provided utilizing the expansion characteristics of water when it undergoes a change from the liquid state to the solid state. An ampul having one side made weaker than its opposite side is substantially filled with water. Indicator paper having ink printed on one side is situated adjacent to the ampul. The indicator paper and ampul are housed in a blister pack plastic container for protecting the ampul from breakage. When the temperature around the indicator reaches the freezing point of water, the ampul breaks. During a subsequent thawing, the water flows on to the indicator paper causing the ink which is printed on one side to wick up, thereby indicating that the freeze or thaw has taken place.

30 Claims, 6 Drawing Figures

FREEZE-THAW INDICATOR

BACKGROUND OF THE INVENTION

This invention relates to a device for detecting a freeze or thaw condition. More particularly, it relates to an improved freeze-thaw indicator utilizing a liquid-filled frangible ampul, with one side weakened with respect to the other for reliable indication.

Foods, pharmaceuticals, and other items are often frozen in order that they may be preserved for consumption sometime later. If these items are thawed, even for a short period of time, they may be subject to spoilage and, at the very least, their characteristics may change so that they are undesirable for later use. Conversely, there are other materials which are rendered relatively useless if the ambient temperature goes below the freezing point of water. It is, therefore, desirable to provide an indicator device which will accurately show whether or not an item or environment has gone through the freezing point of water or some other liquid.

One example of a device which has been used in the past as a freeze-thaw indicator is described in U.S. Pat. No. 3,177,843, issued Apr. 13, 1965, and invented by R. S. Geocaris. The Geocaris patent shows a device utilizing a frangible capsule which is located adjacent to a liquid absorbent material. The frangible capsule is filled with colored water and when the colored water freezes, the capsule will break. When the water subsequently thaws, the coloration will be absorbed by the absorbent material to indicate that a freeze or thaw has occurred. One of the problems associated with the device set forth in the Geocaris patent is that the use of a coloring additive in the water changes the freeze characteristics of the water such that it may not freeze near 0° C. A further problem with the Geocaris device is that the capsule is a concentric device. The freeze expansion forces would be applied equally to all sides which may cause the capsule not to break. Another shortcoming with the Geocaris device is how to fill the capsule with enough liquid such that the water to ice expansion will be sufficient to break the capsule.

Another problem in prior art freeze-thaw indicators is the protection of the frangible capsule during a non-freeze condition; that is, if the capsule is not adequately protected from mechanical shock, it may be broken, thereby giving a false indication. It is, therefore, desirable to provide a freeze-thaw indicator which overcomes these and other deficiencies of the prior art.

OBJECT OF THE INVENTION

It is one of the objects of this invention to provide an improved freeze-thaw indicator.

It is another object of this invention to provide a device which will reliably indicate that an environment has gone through the freezing point of water.

It is another object of the invention to provide an improved freeze-thaw indicator that is reliable and provides a clear indication of a freeze or thaw condition.

It is another object of this invention to provide a freeze and thaw indicator which utilizes an ampul substantially filled with water which consistently breaks near the freezing point of water.

SUMMARY OF THE INVENTION

In accordance with one form of this invention, there is provided a device for indicating that an environment has reached or passed the temperature near the freezing point of a liquid. The device includes a frangible, sealed container. One of the faces of the container is weaker than the opposite face. A liquid is enclosed in the container, the liquid has the characteristic of volume expanding at or near its freezing point. The frangible, sealed container will break upon the expansion of the liquid, thereby indicating that the environment has reached or passed through a temperature near the freezing point of the liquid. The container may be protected by a preformed blister pack.

BRIEF DESCRIPTION OF THE DRAWINGS

The subject matter which is regarded as this invention is set forth more particularly in the claims. The invention itself, however, together with further objects and advantages thereof may be better understood by referring to the following description taken in conjunction with the accompanying drawings in which:

DESCRIPTION OF THE PREFERRED EMBODIMENT

Figure 1:
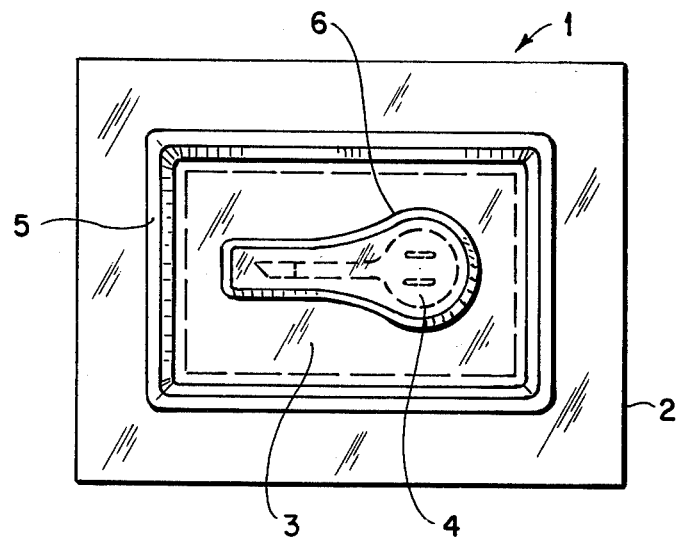
FIG. 1 is a plan view of the freeze-thaw indicator incorporating one form of the present invention.
Figure 5:
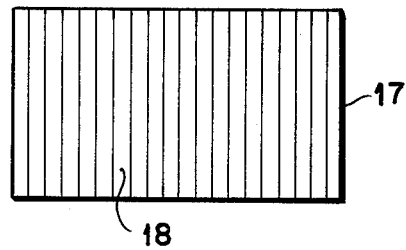
FIG. 5 is the bottom view of a liquid-responsive strip utilizing one form of the present invention.
Figure 6:
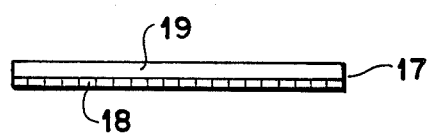
FIG. 6 is a side view of the liquid-responsive strip shown in FIG. 5.

Referring now more particularly to FIG. 1, there is provided freeze-thaw indicator 1. A blister pack covering 2 partially encloses a liquid-responsive material 3 and ampul 4. Indicator material 3 may be an absorbent paper having water soluble ink printed on one side. The indicator material will be described in more detail with reference to FIGS. 5 and 6. Again referring to FIG. 1, the ampul 4 is substantially filled with a liquid which expands in volume upon freezing. One example of such a liquid is water. The ampul rests on the top of indicator material 3. In the preferred embodiment of the invention, the ampul is at least 91.5% by volume filled with water and a nucleating agent such as silicon carbide. The ampul will be more thoroughly discussed in reference to FIGS. 3 and 4.

The blister pack covering 2 includes raised portions 5 and 6 which provide mechanical shock protection for the ampul 4. Raised portion 6 surrounds and contains the ampul. These raised portions may be more clearly seen in reference to FIG. 2.

Figure 2:
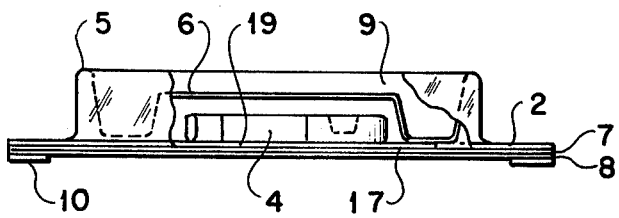
FIG. 2 is a side view of the freeze-thaw indicator shown in FIG. 1.

FIG. 2 shows a side view of the freeze-thaw indicator as shown in FIG. 1. One of the major problems in the use of a glass ampul water carrying device is that the ampul is not only broken during the freeze condition, but it also may be broken due to mechanical shock. The raised portions 5 and 6 alleviate much of the hazard of breaking the ampul 4 during transport or otherwise when exposed to mechanical shock. The raised portion or portions may be of various shapes and may be situated in other areas on the blister pack so long as they provide protection for the ampul.

The bottom of the blister pack covering includes a cardboard layer 8 having a metallized foil 7 attached thereto for conducting heat away from the inner chamber 9 of the blister pack. This will help alleviate the problem of air trapped in the blister pack which may act as a thermal insulator. A strip of adhesive material 10 may be applied to the back of the cardboard so that the freeze-thaw indicator may be easily attached to frozen food boxes, pharmaceuticals, or the like.

Figure 3:
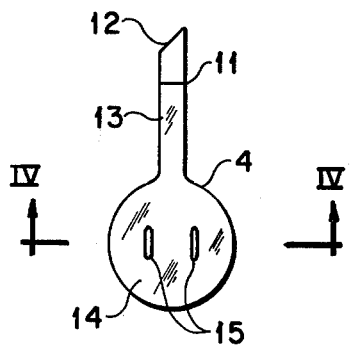
FIG. 3 is a plan view of an ampul utilized in the freeze-thaw indicator incorporating another aspect of the invention.
Figure 4:
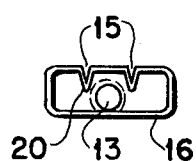
FIG. 4 is a side view of the ampul shown in FIG. 3.

Referring now more particularly to FIG. 3, there is provided ampul 4 which in this embodiment, is a frangible glass container. The ampul is at least 91.5% filled with water as indicated by the water level 11. The ampul is sealed at 12, either by use of heat seal, or other material such as silicone rubber, which may be placed over the end of the ampul. The ampul is at least 91.5% filled because the volumetric expansion of water when changing to ice is approximately 8.5%. However, in order to insure that the glass will break, it is better for the ampul to be filled at least 95% full of water.

It has been found that under certain circumstances, water will become supercooled; that is, the temperature will pass well below the freezing point of water such as $-6°$ to $-10°$ C. before the water actually freezes. Therefore, a nucleating agent such as silicon carbide should be added to the water to counteract this supercooling effect. A nucleating agent is generally a crystalline material which enables the water crystals to begin growth. An alternative to a nucleating agent would be to scar or scratch the inner surface of the ampul so that the ice crystals will have something to attach to and thus grow.

The ampul in this embodiment includes two portions, a tube portion 13, and a flat bulb or disc portion 14. This shape is preferred for several reasons. One reason is that it is easier to fill the ampul to near 95% volume with water than with other geometric shapes. Furthermore, it has been shown that this shape will break easier under the mechanical stresses of freezing as opposed to a cylindrical or spherical shaped ampul. Indentations 15 which are in the shape of a longitudinal wedge, have been formed in the disc portion of the ampul in order to make one side of the ampul stronger than the other, as well as to provide a place for crystal growth. The side with the indentations is stronger than the smooth side which is opposite. This may be shown more clearly in FIG. 4. As can be seen, one side includes indentations 15 and a smooth opposite side which is indicated as 16. The ampul bulb portion is actually a flattened sphere or disc. The fact that it is irregular will enable the forces to be out of balance, thus insuring that the ampul will break on the smooth side when the water inside freezes. It is desirable that the lower shape portions 20 of indentations 15 be as close as possible to the smooth surface 16 so that the period of time for crystal growth to occur will be short. The lower portions 20 are sharp because it has been found that crystal growth occurs more readily on this sharp portion than on a flat surface. Thus, it may be seen that indentations 20 provide the dual function of giving strength to one side of the disc and giving a place where crystal growth is encouraged. The breaking of the ampul and thus an indication of freezing will be provided almost instantaneously.

Some prior art devices utilized colored water to show that freeze has occurred. However, use of colored water requires very close quality control of the amount of coloring added to the water because the coloring affects the freeze point. The device shown in FIGS. 5 and 6 helps alleviate this problem. An absorbent material such as filter paper 17 includes a water soluble dye 18 impregnated as a layer. The other side of the paper 19 remains non-dyed. The side 19 could be the portion adjacent to ampul 4 as shown in FIG. 2. When one looked at the freeze-thaw indicator through the clear blister pack 2 prior to a freeze condition, he would see a white or non-dyed indicator surface. If and when freeze occurred, the ampul containing the water and nucleating agent would break. As soon as thaw occurred, the water would go into the absorbent filter paper and become mixed with the water soluble dye 18. The water soluble dye would then migrate or wick up to the top surface 19 of the filter paper thereby permanently indicating that a freeze and/or thaw has occurred.

As can be seen, this indicator device may be used as either a freeze or a thaw indicator. If one attaches the device to a frozen product, the ampul 4 will almost immediately fracture; however, since the water in the ampul remains frozen, it will not given an indication of freeze until the material thaws. When the material thaws, the water in the ampul also will thaw and thus leak down to the water soluble ink in the impregnated filter paper, giving an indication of thaw as previously described. The indicator device may also be attached to a non-frozen product. When the non-frozen product goes through a freeze state, the same phenomena occurs; however, before a true indication of the fact that the material has been frozen may be observed, the material must be thawed at some time. This thawing, of course, will also enable the water to flow from the fractured ampul onto the filter paper. The water soluble dyye will leach up to surface 19 of the filter paper thus indicating that the freeze has, at some time, occurred.

From the foregoing description of the exemplification embodiment, it will be apparent that many modifications may be made therein. It will be understood, therefore, that this embodiment is intended as an exemplification of the invention only and that the invention is not limited thereto. It is to be understood, therefore, that it is intended in the appended claims to cover all such modifications as fall within the true scope of the invention.

What is claimed is:

1. A device for indicating that an environment has reached or passed through the temperature near a freezing point of a liquid comprising:
a frangible sealed ampul, a liquid being enclosed in said ampul, said liquid having the characteristic of expanding in volume at or near its freezing point, said ampul having at least a first and a second face, said first face having an indentation projecting relatively close to but spaced from said second face inside of said ampul, said indentation forming a sharp acute angle inside of said ampul, said indentation performing the dual function of providing a site for encouraging crystal growth when said liquid is at or near its freezing point and further providing a mechanism for strengthening said first face of said ampul relative to said second face whereby said frangible, sealed ampul will consistently break upon the expansion of said liquid, thereby indicating that the environment has reached or passed through a temperature near the freezing point of said liquid.

2. A device as set forth in claim 1 further including an indicator material in proximity to said ampul, said indicator material being responsive to the release of said liquid when said container is broken.

3. A device as set forth in claim 2 wherein said indicator material is a strip of paper having a dye impregnated on one side.

4. A device as set forth in claim 1 further including a housing, said housing protecting said frangible sealed ampul.

5. A device as set forth in claim 4 wherein said housing is substantially hermetically sealed.

6. A device as set forth in claim 5 wherein one side of said housing is a preformed blister pack.

7. A device as set forth in claim 6 wherein said blister pack includes at least one embossment for protecting said frangible container.

8. A device as set forth in claim 6 further including another side of said housing, said other side including a layer of metallized foil for conducting heat from said housing.

9. A device as set forth in claim 1 wherein said frangible sealed ampul includes a glass ampul.

10. A device as set forth in claim 9 wherein said ampul is at least 91.5% by volume filled with a liquid including water.

11. A device as set forth in claim 10 further including a nucleating agent contained in said liquid for promoting ice crystal growth.

12. A device as set forth in claim 11 wherein said nucleating agent is silicon carbide.

13. A device as set forth in claim 9 wherein said ampul is heat sealed.

14. A device as set forth in claim 9 wherein said ampul is sealed by silicone rubber.

15. A device as set forth in claim 1 wherein said ampul has a volume substantially greater at one end than at the other end.

16. A device as set forth in claim 15 wherein said one end of said ampul is substantially in the shape of a disc.

17. An ampul as set forth in claim 1 wherein said at least one indentation is in the shape of a longitudinal wedge.

18. An ampul as set forth in claim 1 wherein said ampul is heat sealed.

19. A device for use with a freeze or thaw indicator comprising:
an ampul adapted to be at least partially filled with a liquid which undergoes volume expansion when its temperature passes below its freezing point; said ampul including a disc shaped portion and a narrow cylindrical portion integral with said disc shaped portion, one side of said disc shaped portion having at least one indentation projecting into the inside of said ampul relatively close to but spaced from the side opposite said one side of said disc shaped portion, said indentation forming a sharp, acute angle inside of said ampul wherein said one side is made stronger than said opposite side of said disc shaped portion and crystal growth is encouraged at said sharp, acute angle in said indentation, whereby said ampul will normally break at a predetermined temperature.

20. An ampul as set forth in claim 19 wherein said ampul is sealed by silicone rubber.

21. An ampul as set forth in claim 19 wherein said ampul is made of a frangible glass.

22. An ampul as set forth in claim 19 wherein said ampul is substantially filled with a liquid which includes water.

23. An ampul as set forth in claim 22 further including a nucleating agent for promoting ice crystal growth.

24. An ampul as set forth in claim 26 wherein said nucleating agent is silicon carbide.

25. An ampul as set forth in claim 22 wherein said water is filled to include at least 95% by volume of said container.

26. An ampul as set forth in claim 19 wherein a portion of the inner surface of said ampul is etched for providing a place for crystal growth at or near the freezing point of said liquid.

27. A freeze-thaw indicator comprising:
a frangible ampul; a porton of the inner surface of said ampul being irregular for promoting crystal growth; a material in said frangible ampul adapted to undergo a phase change at a predetermined temperature, said material undergoing volumetric expansion as it passes below said predetermined temperature in going to a solid phase rupturing said ampul; a nucleating agent contained by said ampul for further promoting crystal growth; a blister pack including a top portion and a bottom portion, said top portion of said blister pack including at least one raised portion, said frangible ampul being contained by said blister pack; said raised portion protecting said ampul from mechanical shock.

28. A device as set forth in claim 27 wherein said blister pack is substantially transparent.

29. A device as set forth in claim 28 further including a heat conductive backing attached to said blister pack.

30. A device as set forth in claim 28 further including an ampul, said ampul being substantially filled with water, and an indicator material responsive to said water; said ampul and said indicator being cover by said blister pack.

* * * * *